Aug. 7, 1962 T. W. GRIFFIN 3,048,348
WIRE FENCING STRINGING AND STRETCHING IMPLEMENT
Filed May 21, 1959 3 Sheets-Sheet 1

INVENTOR
Theron W. Griffin
BY Mason, Fenwick & Lawrence
ATTORNEYS

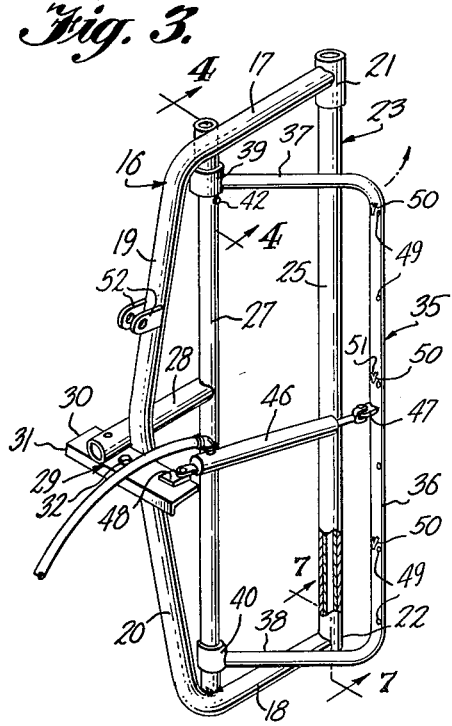

Aug. 7, 1962  T. W. GRIFFIN  3,048,348
WIRE FENCING STRINGING AND STRETCHING IMPLEMENT
Filed May 21, 1959  3 Sheets-Sheet 3
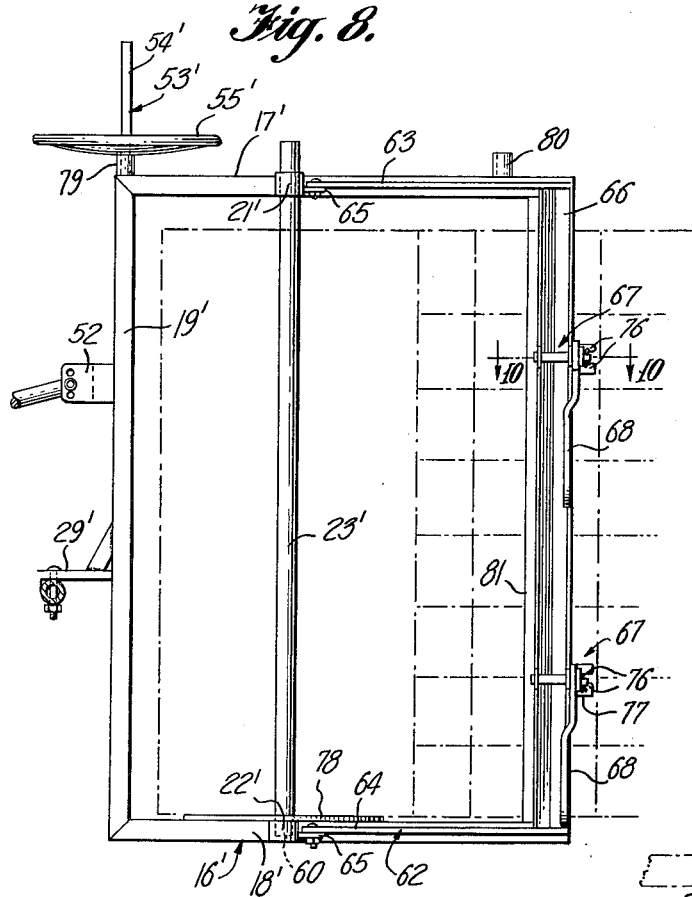
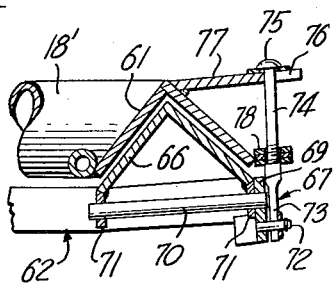
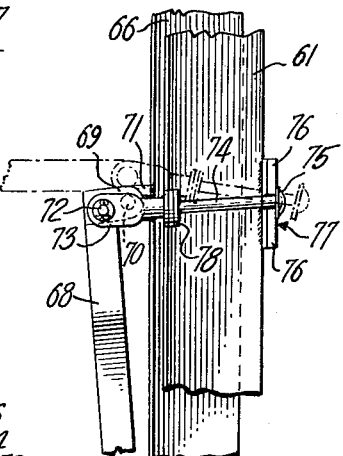
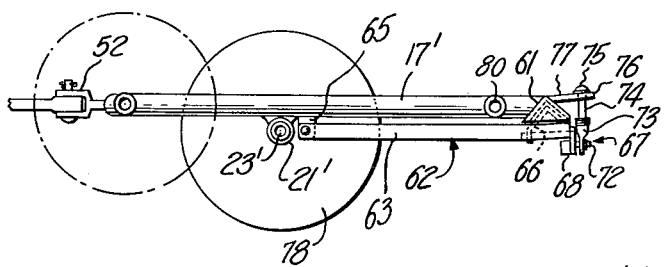
INVENTOR
Theron W. Griffin
BY Mason, Fenwick & Lawrence
ATTORNEYS United States Patent Office 3,048,348
Patented Aug. 7, 1962

3,048,348
WIRE FENCING STRINGING AND STRETCHING IMPLEMENT
Theron W. Griffin, Rte. 1, Box 102, New London, N.C.
Filed May 21, 1959, Ser. No. 814,930
12 Claims. (Cl. 242—86.5)

The present invention relates in general to wire fence erecting implements, and more particularly to tractor mounted implements for stringing and stretching woven wire fencing and, if desired, simultaneously stringing and stetching barbed wire. This application is a continuation-in-part of my earlier co-pending application Serial No. 735,799, filed May 16, 1958, now abandoned.

The stringing and stretching of woven wire fencing on farms is a tedious and exacting task when performed with the tools which are presently available commercially for this purpose. After the line posts have been driven at the desired location for the fence, the woven wire has usually been rolled off by hand from a stock roll of the woven wire in horizontal position alongside the line posts. The wire is then anchored to the corner post at one end of the stretch of fence and a jack stretcher is manually moved along the line of posts and attached to successive posts or to alternate posts to stretch the fence and permit it to be fastened to the post or posts intervening between the jack stretcher and the line posts to which the fence was last anchored. In order to avoid injury to the fencing, the winch or winches provided on the jack stretcher must be manipulated slowly to provide gradual straightening of the fence against the line posts. Great care is required to effect uniform stretching of the fence in this manner. It accordingly involves laborious and time-consuming operations.

An object of the present invention is the provision of a novel woven wire fence stringing and stretching implement which is adapted to be readily secured to a tractor hitch, and which is exceedingly simple and inexpensive in construction and facilitates unreeling of woven fencing and stretching of the same to permit erection of a woven wire fence with a minimum of labor and time.

Another object of the present invention is the provision of a novel tractor mounted wire stringing and stretching implement to facilitate laying and stretching of woven wire fencing and simultaneous stringing and stretching of barbed wire.

Another object of the present invention is the provision of a novel tractor mounted implement for supporting rolls of woven wire fencing in a manner facilitating laying of the woven wire fence in a vertical position alongside a string of line posts, and wherein means are provided for selectively holding the roll or wire fencing against movement in an unreeling direction to permit the tractor to be employed as the source of power for stretching the fence.

Other objects, advantages and capabilities of the present invention will become apparent from the following detail description, taken in conjunction with the accompanying drawings illustrating one preferred embodiment of the invention.

In the drawings:

FIGURE 3 is a perspective view of the wire stringing and stretching implement removed from the tractor hitch;

FIGURE 4 is a fragmentary, enlarged section view taken along the line 4—4 of FIGURE 3 showing the manner in which the wire roll holding bar is coupled to the frame of the implement, the parts being shown in unlocked position;

FIGURE 5 is a section view taken along the line 5—5 of FIGURE 4;

FIGURE 6 is a perspective view of the implement portions forming the joint between the holding bar and the frame, shown in locked position; and FIGURE 7 is a section view taken along the line 7—7 of FIGURE 3.

FIGURE 8 is a side elevation of a modified form of implement embodying the present invention;

FIGURE 9 is a top plan view of the modified form;

FIGURE 10 is a fragmentary horizontal section view of the clamping mechanism for the modified form, taken along the line 10—10 of FIGURE 8; and FIGURE 11 is a fragmentary end elevation of the clamping mechanism viewed from the right of FIGURE 10.

Figure 1:
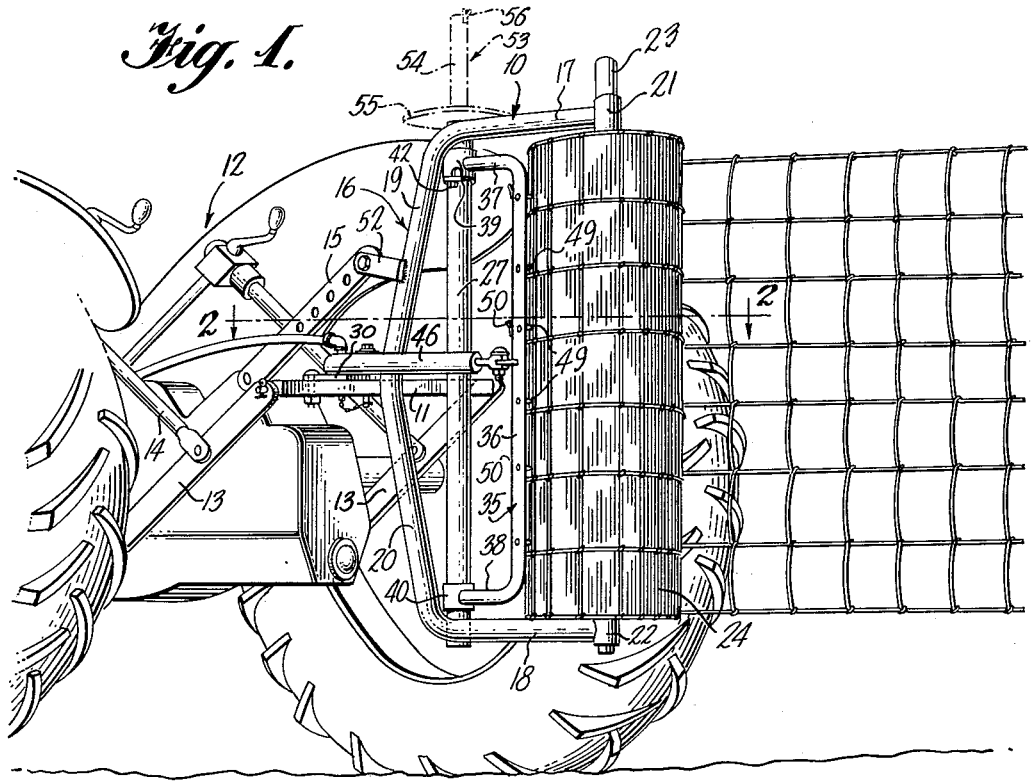
FIGURE 1 is a perspective view illustrating the woven wire stringing and stretching implement embodying the present invention mounted in position on a tractor in a condition of use.

Referring to the drawings, wherein like reference characters designate corresponding parts throughout the several figures, and particularly the embodiment shown in FIGURES 1 to 7, the woven wire fence stringing and stretching implement, generally indicated by the reference character 10, is especially adapted to be removably supported on the transverse drawbar 11 of a conventional three-point tractor hitch associated with the tractor 12, the drawbar being connected to side links 13 which are controlled by lift arms 14 coupled to the usual hydraulic or mechanical drive. The upper link of the three-point tractor hitch is indicated by the reference character 15.

The fence stringer and stretcher implement 10 includes a rearwardly opening, generally U-shaped main frame 16, which may be bent from 1½ inch pipe. The main frame 16 comprises a pair of generally horizontal, rearwardly extending arms 17 and 18 disposed in a common vertical plane and an interconnecting bridge portion formed of forwardly converging sections 19, 20 converging to an apex at about the vertical center of the implement. The rearwardly disposed ends of the arms 17, 18 of the main frame 16 terminate in a collar or sleeve 21 and socket-forming sleeve 22 formed on a common vertical axis and affixed to the upper arm 17 and lower arm 18 respectively. The collar 21 may be formed of a section of 2½ inch pipe and the socket-forming sleeve from a section of 2 inch pipe. The collar 21 and sleeve 22 form vertically aligned journaling means for a removable, vertically disposed spindle shaft 23 forming the spindle for the roll of woven wire fencing 24. The spindle shaft 23 is formed of an upper section 25 whose outer diameter is complementary to the inner diameter of the collar 21 and a lower section 26 whose outer diameter is complementary to the inner diameter of the sleeve 22, this being preferably formed by a 2 inch pipe and a 1½ inch pipe respectively, the 1½ inch pipe being fitted upwardly into and welded or otherwise secured in the lower end of the 2 inch pipe 25.

The implement illustrated in the preferred embodiment shown in the accompanying drawings is designed to handle woven wire of 26 inch, 32 inch, 39 inch and 48 inch types, and to this end the vertical spacing of the arms 17, 18 of the main frame 16 will preferably be about 50 inches. The length of pipe forming the larger diameter section 25 of the spindle shaft 23 is of sufficient length so that the upper end of the spindle shaft 23 will project about 4 inches above the collar 21 when the lower end of the section 25 abuts the socket forming sleeve 22.

If desired, the smaller diameter pipe section 26 and larger diameter pipe section 25 may be of equal length so that the two are coextensive over the space between the collar 21 and sleeve 22 to give additional strength to the spindle shaft 23.

A fulcrum shaft 27 extends vertically between the arms 17 and 18 and is welded alongside its upper and lower ends on the sides of the arms 17 and 18 in a condition of parallelism with the spindle shaft 23 and located adjacent the bends at the forward ends of the arms 17, 18. The fulcrum shaft 27 may conveniently be formed of 2 inch pipe. Extending horizontally forward from the center of the fulcrum shaft 27 is an arm 28, which may be formed of 2 inch pipe, which is welded at its inner end to the fulcrum shaft 27 and projects alongside and forwardly of the apex of the vertical portions of the main frame 16 formed by the forwardly converging sections 19, 20. The arm 28 is likewise welded to the main frame 16 where it crosses alongside the same and has welded to its forward end a section of angle iron 29 having a horizontal flange 30 and a depending vertical flange 31 which extend transversely of the implement and is designed to fit over the drawbar 11 of the tractor 12. The angle iron mounting bracket 29 is also welded to the main frame 16 at the apex of the sections 19, 20 and is provided with an aperture 32 located at the transverse center of the horizontal flange 30 adapted to receive a pin 33 of sufficient length to extend downwardly through the aperture 32 and a registered aperture in the drawbar 11, the pin 33 being preferably of the type having a diametric opening therethrough to receive a cotter key or like device for retaining the pin in locking relation to the angle iron bracket 29 and drawbar 11. It will be apparent that the horizontal flange 30 of the angle iron bracket 29 will overlie the flat upper surface of the drawbar 11 and the depending forward flange 31 will nest snugly against the forward surface of the drawbar 11 to facilitate transfer of pulling force from the tractor to the implement 10. An additional aperture 34 is drilled vertically through the forward end portion of the arm 28 and the horizontal flange 30 of the angle iron 29 to provide an aperture for another mounting pin for attaching the implement to older model tractors that are not provided with three-point hitches. It will also be apparent that a shaft or tongue made from 1½ inch pipe may be inserted into the arm 28 and keyed thereto by a pin seated in the aperture 34 to permit the implement to be horsedrawn when the implement is to be supported on sled runners or other supporting means. The sled runners may, for example, be formed of 1½ inch pipe having a transverse cross brace and a 1½ inch pipe extending vertically from the center of the cross brace which may be fitted into the fulcrum shaft 27 to support the frame 16 in vertical position.

The shaft 27 serves as a fulcrum for the holding bar 35 which is preferably in the form of a forwardly opening U-shaped frame having a vertical bar section 36 and forwardly extending, horizontal legs 37 and 38 terminating in sleeves 39 and 40 respectively. The holding bar 35 may be formed of 1¼ or 1½ inch pipe, and the sleeves 39 and 40 formed of 2½ inch pipe.

The upper sleeve 39 affixed to the end of the leg 37 is provided with a pair of substantially diametrically opposed notches, one of which is shown at 41, in the lower edge thereof. Extending diametrically through the fulcrum shaft 27 is a pin 42 which is rotatably supported in the shaft 27 but held against withdrawal therefrom and projects outwardly of the shaft 27 at the opposite ends thereof. A key 43 which may be a ⅜ inch square strip of iron 1½ inches long is welded to the pin 42 at one of the projecting ends thereof. When the pin 42 is rotated to a position disposing the key 43 below the pin 42, as illustrated in FIGURE 6, the key 43 is inactive and the holding bar 35 will be frictionally locked in either the full line position illustrated in FIGURE 2 or the broken line position designated by the reference character 44 in FIGURE 2, by registry of one of the notches 41 with a projecting end of the pin 42 and gravitational force on the holding bar 35 seating the pin 42 in the registered notch 41. The upper end of the sleeve 39 is spaced sufficiently below the arm 17 to permit sufficient vertical movement of the holding bar 35 on the shaft 27 to permit the pin 42 to be rotated from the position wherein the key 43 lies below the axis of the pin 42 to the position, illustrated in FIGURE 4, wherein the key 43 lies above the pin 42. The holding bar 35 may be manually released for rotation from the solid line position illustrated in FIGURE 2 to the dotted line position illustrated by the reference character 45 by sliding the holding bar vertically along the shaft 27 until the pin 42 is released from the notch 41.

Remote control of the position of the holding bar 35 may be effected from the operator's position on the tractor by providing a remote hydraulic cylinder 46 of conventional construction, which is usually supplied as part of the tractor equipment for remote control of implement components. The piston shaft is coupled to a lug 47 welded on the vertical bar section 36 of the holding bar 35 and the cylinder housing of which may be coupled to a lug 48 extending forwardly from the angle iron mounting bracket 29 or may be secured to a suitable anchor provided on the rear of the tractor.

Figure 2:
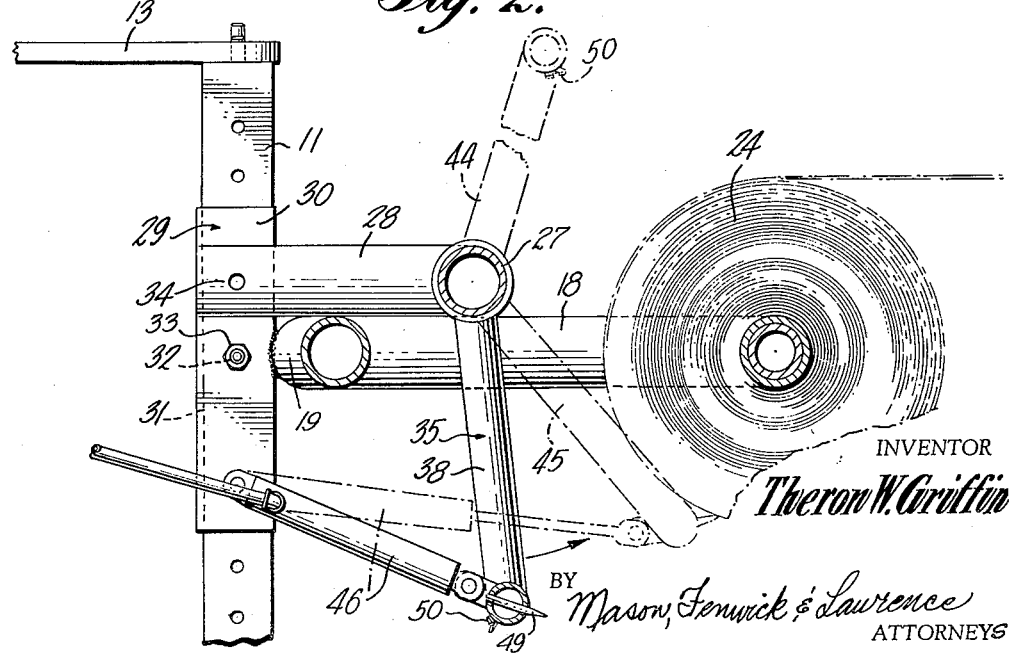
FIGURE 2 is an enlarged fragmentary horizontal transverse section view of the fence stringing and stretching implement, taken along the line 2—2 of FIGURE 1.

The vertical bar section 36 of the holding bar 35 is provided with a series of vertically spaced, pointed pins 49 which may be inserted into holes bored in the bar section 36 with the pointed ends thereof projecting toward the wire roll to engage the vertically extending strands of the outermost layer or layers of woven wire fencing when the holding bar 35 is shifted to the position indicated by the reference character 45 in FIGURE 2 and dog the wire roll against further rotation in a direction which would pay out fencing. The pins 49 are inclined to the roll of wire and spindle shaft 23 at such an angle as to cause the vertical wires which are engaged by the pins 49 to force the bar 35 toward the spindle shaft 23. This causes the bar 35 to be pulled more tightly against the horizontal strands of the fencing so that the burden of holding the roll against rotation during stretching is not placed entirely on the vertical strands. The pins 49 may, for example, be ⅜ inch steel pins spaced about 4 inches apart and which are welded into holes in the bar section 36 and project about 1½ inches from the surface of the bar section 36. The opposite surface of the bar section 36 carries a plurality of substantially V-shaped hooks or holding members 50 each having an upwardly opening notch 51 flanked by bifurcated legs of the hooks 50. These V-shaped hooks 50 are spaced vertically from each other by a distance corresponding approximately to the height of a roll of barbed wire, and the lowermost hook 50 is spaced a corresponding height from the top of the sleeve 22, the hooks 50 being for the purpose of holding barbed wire strands to permit stretching of the barbed wire in a manner to be later described.

The uppermost forwardly converging section 19 of the main frame 16 also carries a pair of forwardly projecting apertured lugs or ears 52 adapted to be connected to the upper link 15 of the three-point tractor hitch to stabilize the implement 10 in erect position.

If desired, a strand of barbed wire may be payed off from a roll of the same simultaneously with stringing of the woven wire fencing 24 by mounting the attachment indicated generally by the reference character 53 and illustrated in broken lines in FIGURE 1, on the implement 10. The barbed wire supporting attachment 53 comprises a spindle 54 which may be formed of a section of 1½ inch pipe about 20 inches long and a sheet metal disk 55 forming a turntable for supporting the barbed wire roll, the disk 55 being, for example, cut in a circle of about 16 inches diameter of ¼ inch thick sheet metal and being welded to the spindle 54 about 6 inches from the lower end of the spindle 54. The lower end of the spindle 54 projecting below the disk 55 will fit into the fulcrum shaft 27 with the disk 55 resting on the upper end of the fulcrum shaft 27 to support the attachment 53 for rotation about the vertical axis aligned with the axis of the shaft 27. The upper end of the spindle 54 carries a V-shaped hook 56 which is identical to the hooks 50.

In the operation of the present invention, assuming the same to be mounted on the three-point hitch of the tractor 12 in a manner which will be apparent from the foregoing description, the roll of woven wire fencing 24 is inserted between the arms 17, 18 of the main frame 16 with the open center of the fence roll aligned with the axes of the collar 21 and sleeve 22 and the spindle shaft 23 removed from the implement 10. The spindle shaft 23 is then lowered axially through the collar 21 and the center of the wire roll and the smaller diameter lower end portion 26 projected through the socket forming sleeve 22, thereby journaling the spindle shaft 23 in the main frame and rotatably supporting the fence roll thereon. Assuming the holding bar 35 to be hydraulically controlled by the hydraulic cylinder 46, the holding bar 35 will be withdrawn to the position indicated in solid lines in FIGURE 2 and the free end of the fencing 24 drawn off of the roll. In this operation under control of the hydraulic cylinder 46, the key 43 on the pin 42 will be disposed above the pin 42 in the position illustrated in FIGURE 4 so as to permit free rotation of the sleeve 39 about the fulcrum shaft 27 without such rotation being arrested upon registry of one of the notches 41 with the pin 42.

After the free end of the fencing 24 is suitably anchored to the corner post, the tractor 12 is driven along the series of line posts for a selected distance, the woven wire fencing 24 being drawn off of the roll which is rotatably supported on the spindle shaft 23 by virtue of the end thereof being anchored to the corner post. When the tractor has traveled the desired distance, the remote control valve located near the operator's seat of the tractor, which valve may be of conventional construction, is operated to activate the hydraulic cylinder 46 so as to shift the holding bar 35 to the position indicated at 45 in FIGURE 2, whereupon the pointed pins 49 on the holding bar 35 project into engagement with the vertical strands of the woven wire fencing on the fence roll and hold the roll against further rotation about the spindle shaft 23. Upon further driving the tractor 12, in a direction away from the corner post to which the end of the fencing is anchored, the woven wire fencing will be stretched taut in a vertical position substantially along the series of line posts and held in a position convenient for attachment of the fencing to the line posts. This operation may be repeated in successive steps to string and stretch spans of fencing of desired length along the line posts. It will be understood that a strand of barbed wire may be simultaneously strung and stretched along the top of the woven wire fencing by fitting the attachment 53 onto the implement 10 with a roll of barbed wire thereon, the end of the barbed wire strand being also anchored to the corner post. However, it will be necessary to manually insert the strand in the notch of the V-shaped hook 56 each time it is desired to stretch the barbed wire strand, so that a barb will be engaged by the bifurcated arms bounding the V-shaped notch of the hook 56 to hold the barbed wire strand against paying out as the tractor is drawn away from the corner post to stretch the fencing.

In the event no hydraulic cylinder 46 or the like is used to control the position of the holding bar 35, the holding bar 35 will be manually adjusted initially to an annular position relative to the fulcrum shaft 27 wherein a notch 41 of the sleeve 39 is seated over a projecting end of the pin 42 with the key 43 disposed below the pin 42 in the position illustrated in FIGURE 6, and the holding bar 35 disposed in the position shown in solid lines in FIGURE 2. In this position of the holding bar, in which it is retained by the seating of the pin 42 in one of the notches 41, the roll of fencing 24 is free to rotate about the spindle shaft 23. When the tractor has been driven to pay out the desired span of fencing, and it is desired to stretch the fencing, the holding bar 35 is shifted vertically so as to free the notch 41 from the pin 42 and is rotated to project the pins 49 into the roll of fencing to hold the fencing against rotation in the manner just described. When the fencing has been stretched by further driving of the tractor, the holding bar 35 is manually returned to the solid line position of FIGURE 2 in which position it is again held during paying out of another span of fencing by the restraining engagement of one of the notches 41 with the pin 42.

By providing the V-shaped hooks 50 on the holding bar 35, the implement is also adaptable to string and stretch multi-strand barbed wire fencing from a plurality of vertically spaced rolls of barbed wire. The rolls of barbed wire will be supported, one over the other, on the spindle shaft 23 by inserting the shaft 23 downwardly through the collar 21 and the openings in the centers of the barbed wire rolls. Prior to insertion of the spindle shaft 23 and barbed wire rolls between the arms 17, 18 of the main frame, the holding bar 35 must be shifted through the major portion of a semicircle from the solid line position of FIGURE 2 to the broken line position indicated by the reference character 44. The holding bar 35 will be normally held in that position by engagement of another one of the notches 41 in the sleeve 39 with a projecting end of the pin 42. The V-shaped hooks 50 are so positioned on the bar section 36 of the holding bar 35 to permit each of the strands of barbed wire from the vertically spaced rolls supported on the spindle shaft 23 to be manually inserted in the notches 51 of the hooks 50 when the holding bar 35 is manually shifted in a manner similar to that described above to dispose the hooks 50 immediately adjacent the barbed wire rolls. The barbed wire rolls will then be restrained from paying out more barbed wire upon further movement of the tractor when one of the barbs engages the V-shaped hook 50 associated therewith to permit stretching of the barbed wire strand.

A modified form of the invention is illustrated in FIGURES 8 to 11 wherein there is shown a different type of holding mechanism for the wire fencing to clamp the fencing when it is desired to stretch a length of fencing. In this form of the invention, the U-shaped main frame, here designated by the reference character 16', may be generally similar to the main frame 16 in that it has a vertically spaced pair of rearwardly extending arms 17', 18' and a vertical bridge portion, here indicated by the reference character 19', which is a straight, vertical pipe section, connecting the forward ends of the arms 17', 18'. The bridge pipe 19' is preferably reinforced or is double strength pipe to avoid bending when stretching a length of fencing, and will carry the usual mounting bracket 29' and apertured lugs 52 to facilitate mounting of the unit on the three-point tractor hitch.

The arms 17', 18' are longer than the corresponding arms 17, 18 of the first embodiment, and each has a U-shaped strap 21', 22' welded thereto at an intermediate point along the arms 17', 18' forming sockets or sleeves for removably supporting the spindle pipe 23' for the reel of wire fencing. A stop plate 60 may be welded to the lower strap 22' to form a bottom wall against which the lower end of the spindle pipe 23' rests.

A vertical angle iron bar 61 is welded to and extends between the rearmost ends of the arms 17', 18' and forms a stationary clamping seat alongside which the wire fencing is payed out in stringing fencing, the flanges of the angle iron bar converging away from the fencing to define a wedge-shaped cavity into which the fencing may be pressed to clamp the fencing.

A movable clamping frame 62 is pivotally supported in the main frame arms 17', 18' and comprises a pair of aligned legs 63, 64 pivoted at their inner ends to ears 65 welded to the arms 17', 18' adjacent the straps 21', 22' and a vertical angle iron bar 66 welded to the outer or free ends of the legs 63, 64. The angle iron bar 66 forms a movable clamping member conforming generally to the stationary angle iron bar 61 and has flanges which converge toward the wire fencing to form a wedge which will nest into the wedge-shaped opening defined by the flanges of the stationary bar 61.

To facilitate secure clamping of the bars 61 and 66 together to tightly hold the fencing therebetween, a pair of clamping devices 67, which are identical in construction, are provided at vertically spaced points on the movable angle iron bar 66. Clamping devices 67 each comprises a lever 68 having an extension 69 extending at an angle to the principal axis of the lever 68 at the inner end thereof, which is pivoted at its end, or at an eccentric location relative to the axis of the lever 68 on a pivot pin 70 journaled in suitable bearing brackets 71 supported on the flanges of the angle iron bar 66. A stud 72 projects outwardly from the lever extension 69 at a point spaced eccentrically relative to the pin 70 and rotatably supports an apertured lug 73 of a cable or tie member 74 having a head or collar 75 at the end thereof remote from the lug 73 to fit behind the ears 76 of a bifurcated locking plate 77 welded onto the stationary angle iron bar 61. The head 75 may be fixed on the tie member 74 in which event several loose washers 78 should be provided on the tie member 74 to be shifted as desired to a position against the head 75 and back of the ears 76, or the head 75 should be threaded onto the tie member 74 or rendered otherwise adjustable axially to vary the separation between the clamping bars 61 and 66 to suit various gauges of wire fencing.

When it is desired to clamp the fencing to stretch a length of fencing which has been payed out, the operator merely swings the clamp frame 62 from an inactive position where the movable clamping angle iron bar 66 is remote from the stationary bar 61 to an active position where the bar 66 nests into the wedge-shaped cavity formed by the flanges of the stationary angle iron bar 61, the tie members 74 are projected through openings in the wire fencing and fitted into the slots formed between the ears 76 of the locking plates 77, and the levers 68 rotated to draw the angle iron bars 66 and 61 tightly together. The relation of the pivot pins 70, the studs 72 and the levers 68 is such that the studs 72 pass slightly "over center" relative to the pins 70, or beyond the axis extending between the pins 70 and the slots of the locking plates 77, when the levers 68 are rotated downwardly into abutment with the bar 66 so that the bars 66 and 61 are retained in fence-clamping position.

When the implement is used to pay out and stretch woven wire fencing, it will be apparent that other arrangements may be provided for restraining the roll of fencing against rotation about the spindle shaft 23 when it is desired to stretch the payed out fencing, it being only necessary for the fence roll holding means to be shiftable from a position wherein it is free of engagement with the roll periphery of the wire fencing to a position wherein it frictionally restrains or stops rotation of the fencing roll about the spindle shaft 23 or stops movement of the wire fencing relative to the supporting frame.

As shown in FIGURE 8, a turntable or flat round disk 78 may be provided on the lower arm 18' in concentric relation with the axis of the spindle pipe 23' to support the wire roll on the spindle pipe and facilitate turning of the wire roll about the spindle. One or more socket members, indicated at 79 and 80, may be provided on the upper arm 17' to provide supports for a barbed wire mounting attachment indicated at 53', which is similar in construction to the barbed wire attachment 53 of the first-described embodiment, including a spindle 54' and a disk 55' forming a turntable for the barbed wire roll. If desired, a hole may be provided in the spindle 54' to register with holes in the socket members 79, 80 and receive a pin, key or the like to hold the spindle 54' against rotation. A pipe 81 may also be welded to the angle-iron bar 61 along the leading edge of the angle-iron bar to facilitate free movement of the unrolled wire fencing past the leading edge of the angle iron bar 61.

It is possible that woven wire which unrolls from the left-hand side of the roll may be encountered in some instances, as where woven wire fencing is purchased from certain European countries. Where it is known that the fence stringing and stretching implement will be used solely with wire of this type, it will be apparent that the holding or clamping bar should be located on the opposite side from that shown and described in the above embodiments. Other provisions may be made to selectively adapt the implement of FIGURES 1 to 7 for handling wire which unrolls from the left-hand side of the roll, as by drilling holes for the pins 49 in the holding bar 35 and removably supporting the pins 49 in these holes so that they may be positioned to project toward the fencing roll when the holding bar 35 is either in the solid line position of FIGURE 2 or in the dotted line position indicated at 44. Alternatively, the legs 37, 38 of the holding bar 35 could be removably coupled to the sleeves 39, 40, as by bolting the legs 37, 38 to stub shafts on the sleeves 39, 40 which telescopically project into the legs 37, 38 to permit the holding bar 35 to be selectively inverted to cause the pins 49 to project in opposite directions.

While only two preferred embodiments of the invention have been particularly shown and described, it is apparent that other modifications may be made in the invention without departing from the spirit and scope thereof, and it is desired, therefore, that only such limitations shall be placed thereon as are imposed by the prior art and are set forth in the appended claims.

What is claimed is:

1. An implement adapted to be coupled to a conveyance and be moved thereby along a line of fence posts for stringing and stretching woven wire fencing comprising a main frame, an elongated spindle shaft, means on said main frame for removably supporting said spindle shaft in upright relation to extend through the center of a roll of woven wire fencing and support the same for unreeling rotation about the axis of the shaft to permit fencing to be drawn off of the fencing roll upon movement of the conveyance away from an anchored part of the fencing secured to a fence post, means for supporting said main frame in a position maintaining the axis of said spindle shaft in a substantially vertical position, releasable holding means supported on said main frame for selectively holding the wire fencing against paying-out movement including strain-receiving portions to enter into holding engagement with exposed portions of the wire fencing at a preselected position relative to the main frame and continually hold the engaged wire fencing portions fixed at said preselected position relative to the main frame during movement of the conveyance and main frame away from said anchored part, and means connecting said strain-receiving portions to the main frame to transfer directly to the main frame the pulling force exerted by the payed-out fencing on said strain-receiving portions during such movement of the conveyance and implement away from the anchored part so that the roll of wire fencing is relieved of unreeling strains during such movement and stretching of the payed-out fencing is effected.

2. An implement adapted to be removably coupled to the drawbar of a tractor and be drawn thereby in trailing relation along a line of fence posts for stringing and stretching woven wire fencing comprising a main frame, an elongated spindle shaft, means on said main frame for removably supporting said spindle shaft in upright relation to extend through the center of a roll of woven wire fencing and support the same for unreeling rotation about the axis of the shaft to permit fencing to be drawn off of the fencing roll upon movement of the tractor away from an anchored part of the fencing secured to a fence post, means including coupling means for attaching the main frame in trailing relation to a tractor drawbar for supporting said main frame in a position maintaining the axis of said spindle shaft in a substantially vertical position, holding means carried by the main frame for selectively holding the wire fencing against paying out movement including a vertical holding bar spanning substantially the height of the fencing and supporting means connected to said main frame selectively supporting said holding bar at an inactive position spaced out of holding engagement with the fencing and an active position disposing said holding bar in engagement with exposed portions of the wire fencing at a selected position relative to the main frame, said holding means including means for positioning the holding bar to hold the engaged fencing portion fixed at said selected location against movement continuously during engagement of the holding bar with the fencing to prevent unreeling of the fence roll and effect stretching of the paid-out fencing during movement of the tractor and implement away from an anchored part of the fencing, said holding bar forming a strain-receiving member having surface portions to enter into holding engagement with the fencing at a plurality of points along the height thereof when the holding bar occupies said active position and said supporting means including means to transfer to the main frame the pulling force exerted by payed-out fencing during movement of the tractor and implement away from the anchored part of the fencing so that the roll of wire fencing is relieved of unreeling strains resulting from said pulling force.

3. An implement adapted to be removably coupled to the drawbar of a tractor or the like and drawn along a line of fence posts for stringing and stretching woven wire fencing comprising a rearwardly opening, generally U-shaped main frame arranged in a vertical plane including a pair of generally horizontally disposed, vertically spaced arms extending rearwardly of the tractor in trailing relation, said arms having vertically aligned journalling means at the rearwardly disposed ends thereof, an elongated spindle shaft removably supported in said journalling means to extend therebetween and support at least one roll of woven wire fencing between said arms in coaxial relation with said spindle shaft to permit fencing to be drawn off of the fencing roll upon movement of the tractor in a direction away from an anchored end of the fencing, an elongated vertically extending holding member of substantially the length of the fencing supported on said main frame for movement transversely of the direction of tractor movement from a first position spacing the holding member from the wire fencing to a second preselected position relative to the main frame located immediately adjacent an exposed portion of the fencing, strain-receiving means on said holding member for engaging an exposed portion of the fencing at said second preselected position and continually holding the engaged wire fencing portion fixed at said preselected position relative to the main frame during movement of the tractor and main frame away from an anchored end of the fencing, and means connecting said strain-receiving means of said holding member to the main frame to transfer directly to the main frame the pulling force exerted by the payed-out fencing on said strain-receiving means during such movement of the tractor and main frame away from the anchored end so that the roll of wire fencing is relieved of unreeling strains during such movement and stretching of the paid-out fencing is effected.

4. An implement adapted to be removably supported on the transverse drawbar of a tractor or the like and be drawn thereby in a vertical position in trailing relation along a line of fence posts for stringing and stretching fencing comprising a rearwardly opening, generally U-shaped main frame arranged in a vertical plane including a pair of generally horizontally disposed, vertically spaced arms extending rearwardly along the axis of travel of the tractor and a connecting frame portion extending between the forward ends of said arms, an elongated spindle shaft of greater length than the span between said arms, said arms having vertically aligned journalling sleeves at the rearwardly disposed ends thereof for removably receiving said spindle shaft therethrough upon axial movement of the spindle shaft along a vertical axis and support said spindle shaft rotationally about its axis between said arms, said spindle shaft being adapted to be projected axially through the center of a roll of woven wire fencing or a plurality of rolls of barbed wire upon projection of the same through said journalling sleeves to support the fencing roll between said arms for rotation about the axis of the spindle shaft to permit fencing to be drawn off of the roll upon movement of the tractor away from an anchored end of the wire fencing, an elongated vertically extending holding member pivotally supported on said main frame about a vertical axis spaced from said spindle shaft for rotation from a first position spacing the holding member from a periphery of a wire fencing roll on the spindle shaft to a second position immediately adjacent the periphery of the fencing roll at one side of the roll and from a third position spacing the holding member from the periphery of the wire fencing roll at the other side of the fencing roll to a fourth position immediately adjacent the periphery of the fencing roll at said other side thereof, strain receiving means on said holding member to project into the fencing roll when the holding member occupies said second position to engage portions of the wire fencing adjacent the periphery of the roll and continually hold the engaged wire fencing portions fixed at a preselected position relative to the main frame during movement of the tractor and main frame away from an anchored end of the payed-out wire fencing, means connecting said strain-receiving means to the main frame to transfer directly to the main frame the pulling force exerted by payed-out fencing during stretching thereof to prevent unreeling rotation of a woven wire fencing roll on the spindle shaft, additional means on the holding member selectively engageable in restraining relation with barbed wire strands when said holding member occupies said fourth position to receive and transfer to the main frame the pulling force exerted by the payed-out fencing during stretching thereof upon forward movement of the tractor and thereby prevent unreeling rotation of barbed wire rolls on the spindle shaft, and mounting means affixed to said main frame for securing the main frame to the tractor drawbar in a vertical position.

5. An implement adapted to be removably supported on the transverse drawbar of a tractor or the like and be drawn thereby in a vertical position in trailing relation along a line of fence posts for stringing and stretching fencing comprising a rearwardly opening, generally U-shaped main frame arranged in a vertical plane including a pair of generally horizontally disposed, vertically spaced arms extending rearwardly along the axis of travel of the tractor and a connecting frame portion extending between the forward ends of said arms, an elongated spindle shaft of greater length than the span between said arms, said arms having vertically aligned journalling sleeves at the rearwardly disposed ends thereof for removably receiving said spindle shaft therethrough upon axial movement of the spindle shaft along a vertical axis and support said spindle shaft rotationally about its axis between said arms, said spindle shaft being adapted to be projected axially through the center of a roll of woven wire fencing or a plurality of rolls of barbed wire upon projection of the same through said journalling sleeves to support the fencing roll between said arms for rotation about the axis of the spindle shaft to permit fencing to be drawn off of the roll upon movement of the tractor away from an anchored end of the wire fencing, an elongated vertically extending holding member pivotally supported on said main frame about a vertical axis spaced from said spindle shaft for rotation from a first position spacing the holding member from a periphery of a wire fencing roll on the spindle shaft to a second position immediately adjacent the periphery of the fencing roll at one side of the roll and from a third position spacing the holding member side of the fencing roll to a fourth position immediately from the periphery of the wire fencing roll at the other adjacent the periphery of the fencing roll at said other side thereof, strain receiving means on said holding member to project into the fencing roll when the holding member occupies said second position to effect holding engagement with portions of the wire fencing at a preselected position along the periphery of the fencing roll relative to the main frame and continually hold the engaged wire fencing portions fixed at said preselected position during movement of the tractor and main frame away from an anchored end of the payed-out wire fencing, and means connecting said strain-receiving means to the main frame to transfer directly to the main frame the pulling force exerted by payed-out fencing on said strain-receiving means during such movement of the tractor and implement away from the anchored end and prevent unreeling rotation of a woven wire fencing roll on the spindle shaft, additional means on the holding member selectively engageable in restraining relation with barbed wire strands when said holding member occupies said fourth position to restrain unreeling rotation of barbed wire rolls on the spindle shaft, fixed restraining means engageable with said holding member when the latter occupies either said first position or said third position and retained in restraining relation with said holding member under the influence of gravity to releasably retain the holding member in said first position or said third position, and mounting means affixed to said main frame for securing the main frame to the tractor drawbar in a vertical position.

6. An implement adapted to be removably supported on the transverse drawbar of a tractor or the like and drawn along a line of fence posts for stringing and stretching fencing comprising a rearwardly opening, generally U-shaped main frame arranged in a vertical plane including a pair of generally horizontally disposed, vertically spaced arms extending along the axis of travel of the implement and a connecting frame portion extending between the forward ends of said arms, said arms having vertically aligned journalling sleeves at the rearwardly disposed ends thereof, an elongated spindle shaft removably insertable axially into said journalling sleeves and through at least one roll of wire fencing to be removably supported between said arms with the fencing roll in coaxial relation therewith, a fulcrum shaft extending between and secured to said arms in parallelism with said spindle shaft and spaced forwardly of said spindle shaft a distance greater than the radius of the wire fencing roll to be accommodated on said spindle shaft, a substantially U-shaped holding frame having a pair of legs extending radially from and journalled on said fulcrum shaft and an elongated holding bar interconnecting the outer ends of said legs, said legs supporting said holding bar for rotation about said fulcrum shaft from an inactive position wherein said holding bar is spaced from the periphery of a roll of fencing on said spindle shaft to an active position wherein said holding bar is immediately adjacent the periphery of the roll of fencing on a side of the roll of fencing away from the side from which fencing is drawn from the roll, holding projections on said holding bar extending generally toward the spindle shaft adapted to extend into the roll of wire fencing on the spindle shaft when the holding bar is juxtaposed thereto and engage portions of the wire fencing to effect holding engagement with portions of the wire fencing at a preselected position along the periphery of the fencing roll relative to the main frame and continually hold the engaged wire fencing portions fixed at said preselected position during movement of the tractor and main frame away from an anchored end of the payed-out wire fencing, and means connecting said holding bar to the main frame to transfer directly to the main frame the pulling force exerted by payed-out fencing on said holding bar during such movement of the tractor and implement away from the anchored end and prevent rotation of the wire roll about the spindle shaft in an unreeling direction, and means projecting forwardly from the connecting portion of said main frame for coupling said implement to the transverse tool bar of a tractor and support said main frame from said tool bar in a vertical plane.

7. An implement adapted to be removably supported on the transverse drawbar of a tractor or the like and drawn along a line of fence posts for stringing and stretching fencing comprising a rearwardly opening, generally U-shaped main frame arranged in a vertical plane including a pair of generally horizontal disposed, vertically spaced arms extending along the axis of travel of the implement and a connecting frame portion extending between the forward ends of said arms, said arms having vertically aligned journalling sleeves at the rearwardly disposed ends thereof, an elongated spindle shaft removably insertable axially into said journalling sleeves and through at least one roll of wire fencing to be removably supported between said arms with the fencing roll in coaxial relation therewith, a fulcrum shaft extending between and secured to said arms in parallelism with said spindle shaft and spaced forwardly of said spindle shaft a distance greater than the radius of the wire fencing roll to be accommodated on said spindle shaft, a substantially U-shaped holding frame having a pair of legs extending radially from and journalled on said fulcrum shaft and an elongated holding bar interconnecting the outer ends of said legs, said legs supporting said holding bar for rotation about said fulcrum shaft from an inactive position wherein said holding bar is spaced from the periphery of a roll of fencing on said spindle shaft to an active position wherein said holding bar is immediately adjacent the periphery of the roll of fencing on a side of the roll of fencing away from the side from which fencing is drawn from the roll, holding projections on said holding bar extending generally toward the spindle shaft adapted to extend into the roll of wire fencing on the spindle shaft when the holding bar is juxtaposed thereto and engage portions of the wire fencing to effect holding engagement with portions of the wire fencing at a preselected position along the periphery of the fencing roll relative to the main frame and continually hold the engaged wire fencing portions fixed at said preselected position during movement of the tractor and main frame away from an anchored end of the payed-out wire fencing, and means connecting said holding bar to the main frame to transfer directly to the main frame the pulling force exerted by payed-out fencing on said holding bar during such movement of the tractor and implement away from the anchored end and prevent rotation of the wire roll about the spindle shaft in an unreeling direction, means projecting forwardly from the connecting portion of said main frame for coupling said implement to the transverse tool bar of a tractor and support said main frame from said tool bar in a vertical plane, said legs of said holding frame terminating in journalling sleeves journalled on said fulcrum shaft, and coacting means on said fulcrum shaft and at least one of said journalling sleeves on said legs engageable in connecting relation under the influence of gravity when said holding bar occupies said inactive position to releasably restrain the holding bar in said inactive position.

8. An implement adapted to be removably supported on the transverse drawbar of a tractor or the like and drawn along a line of fence posts for stringing and stretching fencing comprising a rearwardly opening, generally U-shaped main frame arranged in a vertical plane including a pair of generally horizontally disposed, vertically spaced arms extending along the axis of travel of the implement and a connecting frame portion extending between the forward ends of said arms, said arms having vertically aligned journalling sleeves at the rearwardly disposed ends thereof, an elongated spindle shaft removably insertable axially into said journalling sleeves and through at least one roll of wire fencing to be removably supported between said arms with the fencing roll in coaxial relation therewith, a fulcrum shaft extending between and secured to said arms in parallelism with said spindle shaft and spaced forwardly of said spindle shaft a distance greater than the radius of the wire fencing roll to be accommodated on said spindle shaft, a substantially U-shaped holding frame having a pair of legs extending radially from and journalled on said fulcrum shaft and an elongated holding bar interconnecting the outer ends of said legs, said legs supporting said holding bar for rotation about said fulcrum shaft from an inactive position wherein said holding bar is spaced from the periphery of a roll of fencing on said spindle shaft to an active position wherein said holding bar is immediately adjacent the periphery of the roll of fencing on a side of the roll of fencing away from the side from which fencing is drawn from the roll, holding projections on said holding bar extending generally toward the spindle shaft adapted to extend into the roll of wire fencing on the spindle shaft when the holding bar is juxtaposed thereto and engage portions of the wire fencing to effect holding engagement with portions of the wire fencing at a preselected position along the periphery of the fencing roll relative to the main frame and continually hold the engaged wire fencing portions fixed at said preselected position during movement of the tractor and main frame away from an anchored end of the payed-out wire fencing, and means connecting said holding bar to the main frame to transfer directly to the main frame the pulling force exerted by payed-out fencing on said holding bar during such movement of the tractor and implement away from the anchored end and prevent rotation of the wire roll about the spindle shaft in an unreeling direction, means projecting forwardly from the connecting portion of said main frame for coupling said implement to the transverse tool bar of a tractor and support said main frame from said tool bar in a vertical plane, and remote controlled hydraulic means interconnected between said holding frame and a stationary member relative to said main frame to permit remote control of the position of said holding frame.

9. An implement adapted to be removably supported on the transverse drawbar of a tractor or the like and drawn along a line of fence posts for stringing and stretching fencing comprising a rearwardly opening generally U-shaped main frame arranged in a vertical plane including a pair of generally horizontally disposed, vertically spaced arms extending along the axis of travel of the implement and a connecting frame member extending between the forward ends of said arms, a pair of vertically aligned journal members fixed to said arms intermediate the forward and rearward ends thereof, an elongated spindle shaft removably insertable axially into said journal members for rotatably supporting a fencing roll between said arms and intermediate the forward and rearward ends thereof, a fixed clamping bar across which the fencing is to be drawn from the fencing roll extending vertically between the rearward ends of said arms, a movable vertical clamping bar pivotally supported on said main frame for movement about a vertical axis through an arcuate range from a first position spacing the movable clamping bar from said fixed clamping bar to a second position wherein said movable clamping bar is closely adjacent said fixed clamping bar, said fixed clamping bar being an angle-iron member defining a wedge-shaped recess opening toward said movable clamping bar, and said movable clamping bar being an angle-iron member adapted to be projected into nested relation within said wedge shaped recess, and manually operable coupling means mounted on one of said clamping bars and releasably connectable with the other of said clamping bars for drawing said clamping bars tightly together in nesting relation with wire fencing drawn from the fencing roll clamped therebetween to receive and absorb the pulling force exerted by the fencing extending in trailing relation thereto during stretching of the fencing to hold the wire fencing against withdrawal from the implement for stretching payed-out fencing upon forward movement of the tractor, and mounting means on said main frame for supporting the main frame from a tractor drawbar in a vertical position.

10. An implement adapted to be removably coupled to the drawbar of a tractor or the like and drawn along a line of fence posts for stringing and stretching woven wire fencing comprising a main frame, an elongated spindle shaft, means on said main frame for removably supporting said spindle shaft in upright relation to extend through the center of a roll of woven wire fencing and support the same for unreeling rotation about the axis of the shaft, means including coupling means for attaching the main frame to a tractor drawbar for supporting the main frame in a position maintaining the spindle shaft axis in a vertical position, a pair of vertical clamping bars supported on said main frame in posterior relation to the roll of fencing along the line of travel of the implement between which the fencing is drawn off of the roll including a fixed clamping bar across which the fencing is drawn from the fencing roll extending vertically in parallelism with the spindle shaft axis and a movable vertical clamping bar supported for movement transversely of the direction of tractor movement from a first position disposed out of holding engagement with the fencing to a second position wherein the movable clamping bar is closely adjacent said fixed clamping bar, said pair of clamping bars having complemental facing surfaces configurated to distort the wire fencing extending therebetween out of its normal path when said clamping bars are disposed close together, and manually operable means for selectively forcing said movable clamping bar to said second position to deform and clamp wire fencing extending therebetween for receiving and transferring to the main frame the pulling force exerted by the fencing extending in trailing relation thereto during movement of the tractor and implement away from an anchored part of the fencing and effect stretching of the payed-out fencing.

11. An implement adapted to be removably coupled to the drawbar of a tractor or the like and drawn along a line of fence posts for stringing and stretching woven wire fencing comprising a main frame, an elongated spindle shaft, means on said main frame for removably supporting said spindle shaft in upright relation to extend through the center of a roll of woven wire fencing and support the same for unreeling rotation about the axis of the shaft, means including coupling means for attaching the main frame to a tractor drawbar for supporting the main frame in a position maintaining the spindle shaft axis in a vertical position, a pair of vertical clamping bars supported on said main frame in posterior relation to the roll of fencing along the line of travel of the implement between which the fencing is drawn off of the roll including a fixed clamping bar across which the fencing is drawn from the fencing roll extending vertically in parallelism with the spindle shaft axis and a movable vertical clamping bar supported for movement transversely of the direction of tractor movement from a first position disposed out of holding engagement with the fencing to a second position wherein the movable clamping bar is closely adjacent said fixed clamping bar, said fixed clamping bar being an angle-iron member defining a wedge-shaped recess opening toward said movable clamping bar and said movable clamping bar being an angle-iron member adapted to be projected into nested relation within said wedge-shaped recess, and manually operable means for selectively forcing said movable clamping bar into tightly nesting relation with said fixed clamping bar to deform and clamp wire fencing therebetween for receiving and transferring to the main frame the pulling force exerted by the fencing extending in trailing relation thereto during stretching of payed-out fencing upon forward movement of the tractor and hold the wire fencing against withdrawal from the implement.

12. An implement as recited in claim 9, wherein said coupling means comprises bifurcated locking members projecting from said stationary clamping bar at a plurality of vertically spaced locations, lever members pivoted to said movable clamping bar at vertically spaced locations corresponding to said locking members, and tie members pivoted above and to said lever members at eccentric locations relative to the pivotal coupling of said lever members to said movable clamping bar to be inserted between branches of the bifurcated locking members and having enlarged heads to bear against said locking members and draw said clamping bars tightly together upon rotation of said lever members to an over-center position.

References Cited in the file of this patent
UNITED STATES PATENTS

| | | |
|---|---|---|
| 443,442 | Harper | Dec. 23, 1890 |
| 776,627 | Unsicker | Dec. 6, 1904 |
| 2,416,585 | Holub | Feb. 25, 1947 |
| 2,789,778 | Zogg et al. | Apr. 23, 1957 |
| 2,914,270 | Parker et al. | Nov. 24, 1959 |